(12) United States Patent
Cole et al.

(10) Patent No.: US 10,896,565 B2
(45) Date of Patent: *Jan. 19, 2021

(54) SAFETY SYSTEM AND METHOD

(71) Applicant: GYM DOOR REPAIRS, INC, Great River, NY (US)

(72) Inventors: Stephen F. Cole, Great River, NY (US); Kathleen Cole, Great River, NY (US)

(73) Assignee: Gym Door Repairs Inc., Huntington Station, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/374,116

(22) Filed: Apr. 3, 2019

(65) Prior Publication Data
US 2020/0074775 A1  Mar. 5, 2020

Related U.S. Application Data

(63) Continuation-in-part of application No. 16/155,303, filed on Oct. 9, 2018, now Pat. No. 10,504,311.

(60) Provisional application No. 62/724,844, filed on Aug. 30, 2018.

(51) Int. Cl.
*E04B 2/74* (2006.01)
*G07C 9/37* (2020.01)
*G06K 9/00* (2006.01)

(52) U.S. Cl.
CPC .............. *G07C 9/37* (2020.01); *E04B 2/74* (2013.01); *G06K 9/0002* (2013.01)

(58) Field of Classification Search
CPC ....... E04B 2/74; G06K 9/0002; E05B 1/0092; E05B 11/005; G07C 9/37; E05F 15/60
USPC ........................................ 340/5.52
See application file for complete search history.

(56) References Cited

U.S. PATENT DOCUMENTS

| | | | | |
|---|---|---|---|---|
| 3,666,965 A | * | 5/1972 | Luenser | B30B 15/148 307/112 |
| 5,152,332 A | * | 10/1992 | Siener | E05F 15/605 160/188 |
| 10,504,311 B1 | * | 12/2019 | Cole | G06F 21/32 |
| 2011/0169506 A1 | * | 7/2011 | Aubauer | F24C 7/082 324/633 |

* cited by examiner

Primary Examiner — Vernal U Brown
(74) Attorney, Agent, or Firm — Sorell, Lenna & Schmidt, LLP

(57) ABSTRACT

A method includes providing a first control station and a second control station. The control stations are configured to control movement of a structure. The first control station includes a first device and the second station includes a second device. Movement of the structure is allowed if the second device detects a first object and the second device detects a second object. Movement of the structure is prevented if the first device fails to detect the first object, or the second device fails to detect the second object.

21 Claims, 9 Drawing Sheets

SAFETY SYSTEM AND METHOD

CROSS REFERENCE TO RELATED APPLICATIONS

This application is a continuation-in-part of and claims priority to co-pending U.S. patent application Ser. No. 16/155,303, filed Oct. 9, 2018, which claims priority to U.S. Patent Application No. 62/724,844, filed Aug. 30, 2018. These applications are expressly incorporated herein by reference, in their entireties.

TECHNICAL FIELD

The present disclosure generally relates to electrically operated folding partitions, and more particularly to a safety system and method for preventing injury to persons located in a critical areas of electrically operated folding partitions.

BACKGROUND

Folding partitions or walls having a plurality of vertically oriented panels have conventionally been used to provide temporary walls to, for example, divide off two or more areas of a given room. In particular, folding portable partitions provide a quick and efficient means to divide large open rooms, such as a school gymnasium or auditorium, into smaller areas. The vertically oriented panels are suspended from a horizontal rail system along which the panels are movable. In order to facilitate movement of the portable folding partitions, casters or wheels may be used, which allow the portable partition to be easily positioned to the desired location, and then rolled back into its storage area for later use.

Folding partitions have been adapted to include mechanisms which open and close the moving partitions automatically by an electrical system. Due to the large amount of force needed to move the weight of the folding partitions, electrically operated folding partitions can cause injury, or even death, to a person who accidentally becomes trapped between the partitions.

In order to make electrically operated folding partitions safer, the electrical systems have been adapted to install a safety device that will (a) stop the forward motion of an electrically operated folding partition whenever a person approaches the moving partition and the wall, and (b) stop the partition when a person is present in an area where the partition is being stacked. One such example of this type of electrically operated folding partition is described in U.S. Pat. No. 5,244,030 to Cole et al., the contents of which are incorporated herein by reference. In particular, the electrically operated folding partition described in U.S. Pat. No. 5,244,030 to Cole et al. includes a mechanism for shutting down the electrical operation circuit of the folding operable walls when a physical obstruction interrupts an infrared barrier curtain on opposite sides of an operating path of the folding operable walls. Although this device provides protection when someone approaches the operating doors, it does not provide complete coverage for certain danger areas, especially in a critical area directly between the leading edges of the doors themselves. As such, conventional electrically operated folding partitions often rely on the operator to visually detect people or objects in certain danger areas that are not detectable by safety mechanism. If the operator sees people or objects in any of the danger zones, he or she may stop movement of the partition by turning a switch, for example. However, a single operator may be unable to visually detect people or objects in certain danger areas that are not detectable by safety mechanism. Therefore, it would be desirable to provide a system and method for protecting the critical areas of folding operable walls that requires more than one operator to increase visual coverage of the danger zones.

Dangers associated with electrically operated folding partitions increase when an operator of an electrically operated folding partition is not sufficiently trained or otherwise capable of operating the electrically operated folding partition in a safe manner. Accordingly, it is beneficial to ensure that only authorized users operate the electrically operated folding partition. Some conventional electrically operated folding partitions may require a key to fold or unfold the partition. However, such keys are easily lost and may fall into the hands of an unauthorized user. Conventional electrically operated folding partitions lack other means to prevent unauthorized users from operating the electrically operated folding partitions, thus making any included safety features, such as, for example, a key easy to circumvent. This disclosure describes an improvement over these prior art technologies.

SUMMARY

In one embodiment in accordance with the principles of the present disclosure a method is provided that comprises: providing a first control station and a second control station, the control stations being configured to control movement of a structure, the first control station comprising a first device, the second station comprising a second device; allowing movement of the structure if the second device detects a first object and the second device detects a second object; and preventing movement of the structure if the first device fails to detect the first object, or the second device fails to detect the second object.

In one embodiment in accordance with the principles of the present disclosure a method is provided that comprises: providing a first control station and a second control station, the control stations being configured to control movement of a structure, the first control station comprising a first device and a second device, the second station comprising a third device; capturing and recording a first image using the first device; capturing and recording a second image using the first device; comparing the second image against the first image; allowing movement of the structure if the second image is substantially similar to the first image, the second device detects a first object, and the third device detects a second object; and preventing movement of the structure if the second image is not substantially similar to the first image, the second device fails to detect the first object, or the third device fails to detect the second object.

In one embodiment in accordance with the principles of the present disclosure a method is provided that comprises: providing a first control station and a second control station that is spaced apart from the first control station, the control stations being configured to control movement of a folding wall, the first control station being in communication with the second control station, the first control station comprising a capacitance fingerprint scanner and a first sensor configured to detect touches by a finger of a first individual, the second station comprising a second sensor configured to detect touches by a finger of a second individual; capturing and recording a first image of the first individual's fingerprint using the capacitance fingerprint scanner; capturing and recording a second image of the first individual's fingerprint using the capacitance fingerprint scanner; comparing the second image against the first image; allowing movement of the folding wall if the second image is substantially similar to the first image, the first sensor detects the finger of the first individual, and the second sensor detects the finger of the second individual; and preventing movement of the folding wall if the second image is not substantially similar to the first image, the first sensor fails to detect the finger of the first individual, or the second sensor fails to detect the finger of the second individual.

In some embodiments, the safety system disclosed herein is configured for use with training and authorization program. In some embodiments, all components are designed and manufactured for use on all existing electrically operated partitions and divider curtains.

In some embodiments, a method for operating an electrically operated divider is provided that includes: (a) webinar staff training specific to the safe operation of electrically operated partitions and divider curtains; (b) authorization procedure user code; (c) recording a template of a biological trait of an authorized individual into a biometric verification system at the primary control station #1; (d) saving the template in a database; (e) capturing a new record; (f) comparing the new against the template; (h) confirming the identity of the authorized individual if the new record is substantially similar to the saved template; (i) preventing the electrical operation circuit from functioning if the biometric verification is system fails to authenticate the identity of the authorized individual; (j) restarting the electrical operation circuit after the identity of the authorized individual is verified; (k) prevent unattended operation of equipment incorporating active sensor area at scanner plate; (l) system control panel capable of additional safety features; (m) secondary control station #2 shall prevent unattended operation of equipment incorporating touch sensitive activation; (n) conspicuous notice/warning sign permanently installed at immediate vicinity of each control station; (o) 3-position selector switch shall facilitate operation mode.

In some embodiments, the safety system disclosed herein incorporates a unique blend of staff training certification, state of the art microprocessor controls and backup safety devices to provide uncommon protection for individuals in the vicinity of opening or closing electrically operated partitions and divider curtains. This system provides comprehensive staff training for the safe operation of equipment, typically found in school gymnasiums, auditoriums, and multi-purpose rooms and offers a high security fingerprint recognition device for the selection of operators that are authorized users of the device, and as a dual redundant feature, there is added mechanism that prevents the authorized user from leaving the station or turning over the operation to another. This added feature is a finger presence detector that requires the authorized user's finger to remain in place during the operation of the door system. If the finger of the operator is removed the master control will cease operation.

In some embodiments, during opening and closing modes a user fingerprint is recognized and accepted; an actuator is armed to initiate the system and a green status indicator will begin flashing. The system will then wait for the second safety officer to choose a direction mode and/or manual touch switch on the secondary unit. That is, the use of an authorized user at the primary control station in conjunction with an additional safety officer at the secondary control station provides a full view of the area during operation of the equipment. Once the doors are either opened or closed to their limits the authorized user on the primary control may leave the station and the finger presence detector will cause the operation of the unit to cease and the door can no longer be moved. When operation cycle is complete, secondary control station selector switch must be turned to "off" position.

In some embodiments, the first or primary control station is configured to prevent the unattended operation and shall be of suitable size to house the following equipment: (a) a fingerprint scanning device capable of registering up to 100 users and program codes/key pad assembly; (b) at least one device configured to provide individual fingerprint recognition to accept or deny access; (c) a built-in touch active sensor for one touch operation; (d) at least one device configured for self-learning ability so that a fingerprint template that can be updated after every fingerprint entry; (e) at least one device configured individual fingerprint user and user code deletion; (f) at least one device configured for program code over-ride activation/emergency operation; (g) status indicators; (h) a complete circuit control board/microprocessor assembly; (i) a terminal strip of sufficient size for additional safety features; (j) a power supply capable of operating additional safety features; (k) power transformers, 12 VDC relays, resistors and inter-wiring; (l) interface compatibility with existing (120 VAC/12-24 VDC) power source; (m) an optical sensor; (n) a twelve (12) key keypad; and (o) devices configured for operation at temperature from −4° F. to 150° F. (−20° C. to 65° C.).

In some embodiments, the second or secondary control station is configured to prevent the unattended operation and shall provide the following: (a) single gang electrical box retrofit capability; (b) a touch screen cover plate; (c) touch sensitive operation with capacitance technology; (d) status indicators; (e) an authorized user key and three (3) position selector switch; and (f) wireless radio controlled capability.

In some embodiments, the safety system disclosed herein includes passive infrared detectors (e.g., Safe Path model #SP-80 AM High Sensitivity (PIR) Device) that is wall mounted at 8-10 ft. AFF, self-monitoring circuit operating on 12 VDC input power and have integral anti-masking features capable of automatic (fail to safe) condition function optics. Optics shall be focused to provide detection corridor adjacent to the doors that assures reliable detection. Each Long-Range PIR Detector shall provide multiple individual zones of detection.

In some embodiments, the safety system disclosed herein includes an infrared safety system designed to work as an integral part of the operable partition system. While the partition is in operation a minimum of two (2) infrared sensors monitor each side of the partition run for movement and immediately disengages the motor upon the "safety zone" being interrupted. These infrared beams can span the entire length of the partition at both sides. The protective housing can be sheet metal so as to minimize dust collecting on the lens. Custom manufactured covers having a trapezoidal design can prevent items from resting or hanging on the cover that can cause blockage.

In some embodiments, the safety system disclosed herein includes PIR guards that are constructed of sheet metal with high temperature baked white enamel finish or an approved equal. Each guard is independently fastened to the wall or ceiling with a least four approved fastening devices. In some embodiments, open cage style wire-formed covers are specifically unacceptable.

In some embodiments, the safety system disclosed herein includes a wireless secondary control station capable of surface mounting on an opposite side of partition or divider curtain run at any location to provide full view during operation. The secondary control station can be remotely controlled by a primary control station microprocessor circuit board assembly. The secondary control station requires an authorized users key to select a direction mode. Touch and hold for operation. Function is identical to hard-wired installation and prevents unattended operation.

In some embodiments, the safety system disclosed herein includes an additional two (2) pocket/stack area sensors (e.g., Safe Path model #SP-40SS (PIR)) that are self-contained, self-monitoring circuits, having anti-masking technology, operate on 12 VDC input power, and operate on an adjustable timed circuit. The additional sensors are each mounted at a rear corner at 8 ft. AFF. Additional sensors will be installed as site conditions warrant. Each concealed stack area PIR detector can provide multiple individual zones of detection. In the interest of partition maintenance proper operation and the greater potential for equipment damage, weight sensitive floor mats in the pocket or stack area/s are specifically unacceptable. Photo-electric/point to point light beam sensors mounted below 8' AFF are subject to abuse, provide inadequate protection zones and are specifically unacceptable.

In some embodiments, the safety system disclosed herein includes a visual-audible alert configured to automatically activate during equipment operation cycle. Horn-strobe devices can be wall mounted at opposite sides of partition or divider curtain run. A minimum of two (2) and a maximum of four (4) devices can be hard wired and operate on 24 VDC each. Horn-strobe devices shall be ADA compliant and visual alert lens clear/without color.

In some embodiments, the safety system disclosed herein includes an audio recording voice alert configured to annunciate a message in any language prior to and/or during operation of equipment. Audible messages may be located within primary and secondary control stations. Adjustable timed circuits can actuate audible warning instructions prior to equipment operation. Audible instructions can clearly identify safe operating procedures repeating, during each equipment cycle mode. Audible messaging devices can be capable of remote locations, such as concealed stack areas and any pre-determined appropriate areas for increased safety.

In some embodiments, the safety system disclosed herein includes sensing devices configured to trigger and stop the operation of the equipment. One or more of these sensing devices may be incorporated into the microprocessor circuit control board assembly. Additional devices such as, for example, one or more laser detection sensors, one or more active infrared detectors, one or more presence detection sensors, one or more photoelectric light beam units, one or more pressure sensitive floor mats, and one or more pressure sensitive lead edge components can be incorporated into the safety system as various site conditions permit.

BRIEF DESCRIPTION OF THE DRAWINGS

The features of the present disclosure will become more readily apparent from the specific description accompanied by the following drawings, in which.

Like reference numerals indicate similar parts throughout the figures.

DETAILED DESCRIPTION

The following discussion includes a description of a safety system and methods of use. Alternate embodiments are also disclosed. Reference will now be made in detail to the exemplary embodiments of the present disclosure, which are illustrated in the accompanying figures. Turning now to FIGS. 1-15, the components of a safety system 10 for operating an electrically operated folding wall system, in accordance with the principles of the present disclosure, are illustrated.

Figure 1:
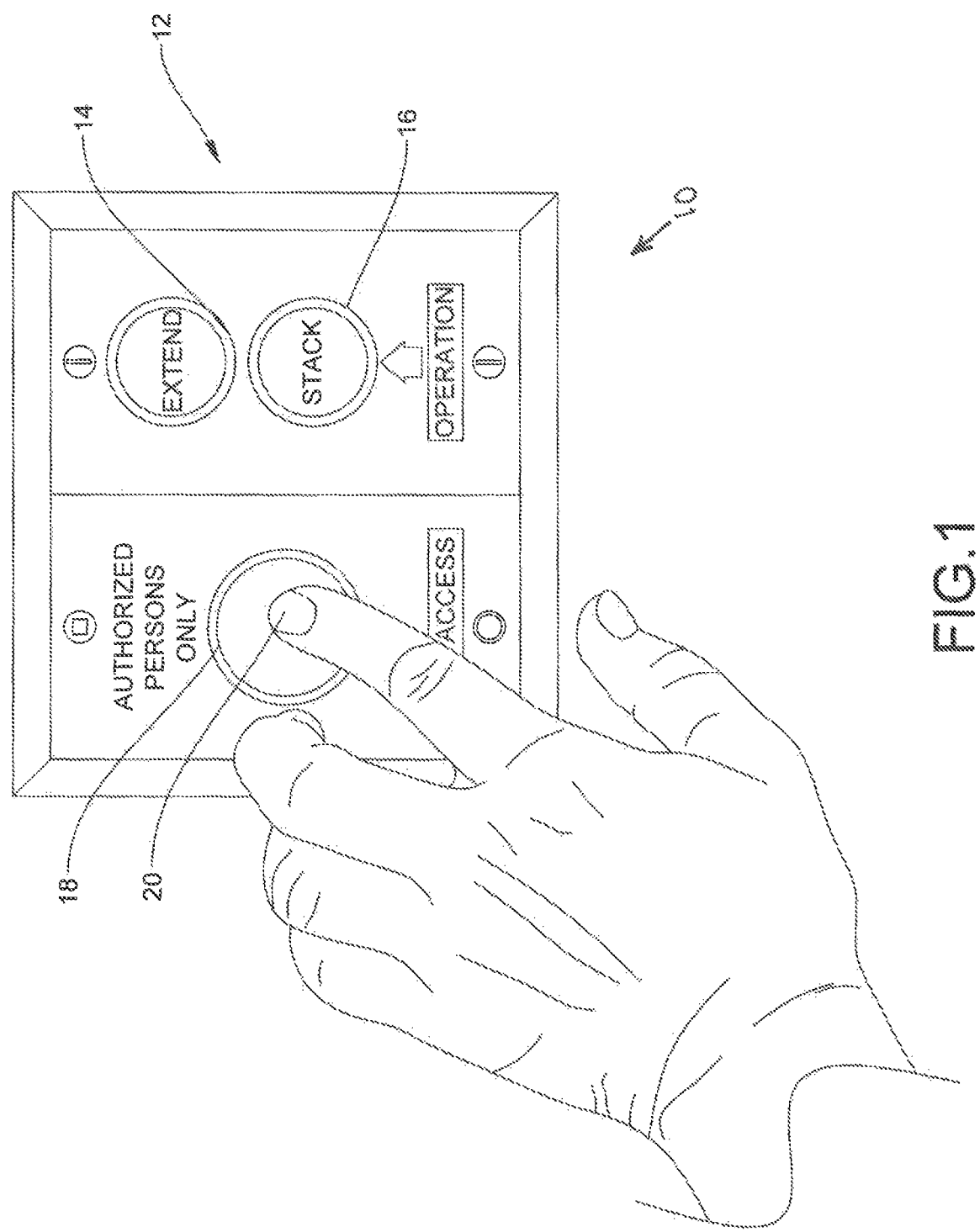
FIG. 1 is a side view of a component of one embodiment of a safety system in accordance with the principles of the present disclosure.
Figure 3:
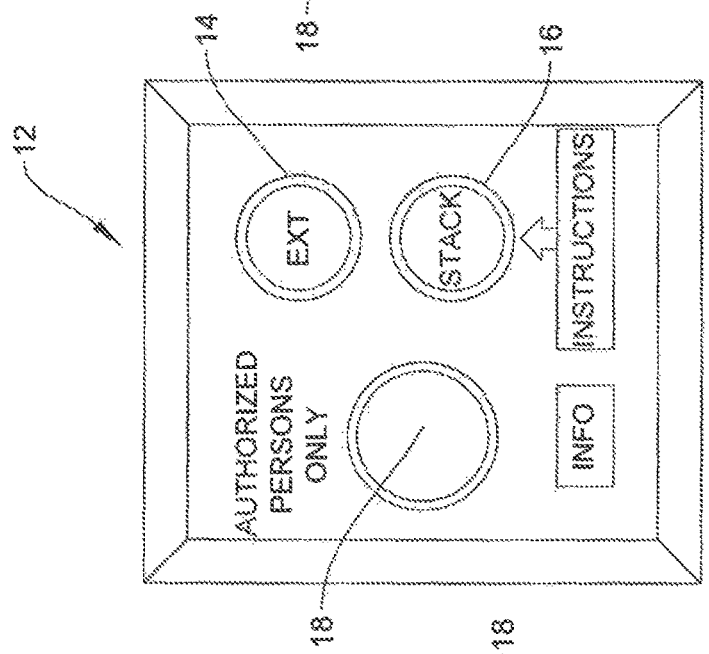
FIG. 3 is a side view of one embodiment of a component of a safety system in accordance with the principles of the present disclosure.

In one embodiment, shown in FIGS. 1 and 3, system 10 includes an electrical operation circuit having at least one control station 12 configured to control an electrically operated folding operable wall, an extend control switch 14, a stack control switch 16, a biometric verification system 18, control relays and a motor. In one embodiment, shown in FIG. 2, system 10 includes an electrical operation circuit configure to control an electrically operated folding operable wall that includes only biometric verification system 18. In another embodiment, shown in FIG. 4, system 10 includes an electrical operation circuit configure to control an electrically operated folding operable wall wherein extend control switch 14 and stack control switch 16 are replaced by key switch 22 having a first position 22a and a second position 22b, which is used to stack and extend the electrically operated folding operable wall, respectively.

In one embodiment, at least one control station 12 is disposed at each end of the electrically operated folding operable wall. In that the presence of at least one individual is required for each control station 12 in order to operate the electrically operated folding operable wall, by including at least one control station 12 on each side of the folding operable wall, the presence of at least two individuals is required the entire time the electrically operated folding wall is being operated. In another embodiment, the system of the present invention includes at least one control station 12 on one end of the electrically operated folding operable wall.

In one embodiment, system 10 includes a device, such as, for example, a scanner configured to capture and record a template of at least one biological trait of an individual trained and authorized to maintain the folding operable wall is first captured by biometric verification system 18 in an enrollment phase. Biological traits include, for example, fingerprints, facial geometry, hand geometry, earlobe geometry, retina and iris patterns, and voice waves.

Biometric verification system 18 may include one or more biometric verification systems selected from the group consisting of: fingerprint recognition systems, facial recognition systems, earlobe geometry recognition systems, hand geometry recognition systems, iris recognition systems, retina recognition systems, voice recognition systems, and combinations thereof.

In particular, the individual trained and authorized to maintain the folding operable wall will provide the required biological trait to biometric verification system 18 by, for example, placing his or her finger 20 on a fingerprint scanner in an enrollment phase, as shown in FIG. 1. The biometric verification system will create a template of the fingerprint from the scan of finger 20 obtained by the fingerprint scanner of biometric verification system 18.

The template is saved in a database or other memory device within control station 12 and/or biometric verification system 18. The template is later compared to a new record to verify the identity of the individual in a test phase, should the individual wish to access or operate the electrically operated folding operable wall. System 10 may include any biometric verification system which records a person's unique biological traits, and stores the same in a database during an enrollment phase; and then captures a new record when identification verification is subsequently required, to compare with the records in the database stored in the test phase to estimate the similarity between the new record and the stored template using an algorithm. In some embodiments, biometric verification system 18 includes a database or other memory device, which is a solid state memory.

When an individual trained and authorized to maintain the folding operable wall desires to gain access to the same, he or she must create or "capture" a new record of the same biological trait previously recorded in the enrollment phase, for example, a fingerprint. Indeed, the individual trained and authorized to maintain the folding operable wall may provide the required biological trait to biometric verification system 18 by, for example, placing his or her finger 20 on the fingerprint scanner included in biometric verification system 18, as shown in FIG. 1. The new record is compared against the template to determine if the new record and the template are substantially similar, using an algorithm. The identity of the individual trained and authorized to maintain the folding operable wall is confirmed if the new record from the test phase is substantially similar to the saved template from the enrollment phase. Once the identity is confirmed, control station 12 will allow the individual to operate the folding operable wall to extend and/or stack the wall, as discussed herein. That is, control station 12 will not allow the individual to operate the folding operable wall to extend and/or stack the wall until the individual's identity is confirmed by matching the new record with the saved template. In some embodiments, "substantially similar," as used herein refers to data and/or features that is/are at least about 50% the same, at least about 60% the same, at least about 70% the same, at least about 80% the same, at least about 90% the same, at least about 95% the same, or at least about 99% the same.

In one embodiment, an individual trained and authorized to maintain the folding operable wall which desires to gain access to the same, may use an artificial reproduction of the biological trait previously recorded in the enrollment phase. The template is compared against the artificial reproduction of the biological trait previously recorded to determine if the artificial reproduction of the biological trait previously recorded and the template are substantially similar, using an algorithm. If the artificial reproduction of the biological trait previously recorded and the template are substantially similar, the identity of the individual whose biological trait was recorded in the enrollment phase is confirmed, thus allowing any individual possessing the artificial reproduction of the biological trait previously recorded to operate the electrically operated folding operable wall. Once the identity is confirmed, control station 12 will allow the individual to operate the folding operable wall to extend and/or stack the wall, as discussed herein. That is, control station 12 will not allow the individual to operate the folding operable wall to extend and/or stack the wall until the artificial reproduction of the biological trait previously recorded is confirmed by matching the artificial reproduction of the biological trait previously recorded with the template.

For example, artificial reproductions of fingers and/or fingerprints may be created from finger 20 of an authorized individual whose fingerprint was previously stored in a database during an enrollment phase using methods known in the art. The authorized individual may provide the artificial finger/fingerprint to an individual whose fingerprint is not recorded in the database (did not participate in the enrollment phase). The individual whose fingerprint is not recorded in the database will provide the required biological trait (e.g., a fingerprint) to biometric verification system 18 in a test phase by, for example, placing the artificial finger/fingerprint on a fingerprint scanner included in biometric verification system 18. The new record of the artificial finger/fingerprint is compared against the template to determine if the new record and the template are substantially similar, using an algorithm. The identity of the individual trained and authorized to maintain the folding operable wall is confirmed if the new record (from the test phase) is substantially similar to the saved template (from the enrollment phase). Once the identity of the individual trained and authorized to maintain the folding operable wall is confirmed using the artificial finger/fingerprint, the individual whose fingerprint is not recorded in the database (did not participate in the enrollment phase) may nevertheless access and operate the electrically operated folding partition.

Furthermore, photographic images of an individual's face, earlobe, hand, iris, and retina may be used to artificially reproduce certain characteristics of an individual's face, earlobe, hand, iris, and retina, respectively. These artificial reproductions (images) may be created to circumvent biometric verification systems 18, such as, for example, facial recognition systems, earlobe geometry recognition systems, hand geometry recognition systems, iris recognition systems, and retina recognition systems. Indeed, photographic images can circumvent facial recognition systems, earlobe geometry recognition systems, hand geometry recognition systems, iris recognition systems, and retina recognition systems to provide a trained, authorized individual responsible for maintaining the electrically operated folding partition the ability to have other trained individuals, whose biometric characteristics are not recorded in a database (did not participate in the enrollment phase), operate, and hence service, the electrically operated folding partition.

The individual trained and authorized to operate electrically operated folding operable walls, who has entered his or her biological data, such as, for example, his or her facial geometry, earlobe geometry, hand geometry, or iris and retina patterns, for example, into the biometric verification system during the enrollment phase, may provide photographic images of his or her face, for example, to an individual whose biological data is not recorded in the database (did not participate in the enrollment phase). The individual whose biological data is not recorded in the database will provide the required biological trait (a photographic image of an individual's retina, for example) to biometric verification system 18 by, for example, placing the photograph in front of a camera included in biometric verification system 18. The new record of the photographic image is compared against the template to determine if the new record and the template are substantially similar, using an algorithm. The identity of the individual trained and authorized to maintain the folding operable wall is confirmed during the test phase if the new record is substantially similar to the saved template. Once the identity of the individual trained and authorized to maintain the folding operable wall is confirmed, the individual whose biological data is not recorded in the database (did not participate in the enrollment phase) may nevertheless access and operate the electrically operated folding partition. Indeed, any individual possessing the artificial reproduction of the biological trait previously recorded may operate the electrically operated folding operable wall.

Artificial reproductions of an individual's voice may be used to circumvent voice or speaker recognition systems. Indeed, an authorized individual, whose voice print is recorded in a database of a voice recognition system during the enrollment phase, may record his or her voice to create an artificial reproduction thereof. He or she may provide the voice recording to an individual whose voice print is not recorded in the database (did not participate in the enrollment phase), in order to allow that individual to access and operate the electrically operated folding partition. The individual will be able to access and operate the folding operable wall if the voice recording is substantially similar to the saved template.

A preventing means prevents the electrical operation circuit of the folding operable wall from functioning if biometric verification system 18 fails to authenticate the identity of an individual which is trained and authorized to operate the folding operable wall, which has had his or her biological trait(s) recorded and saved by biometric verification system 18 in an enrollment phase, from the new record. In particular, the preventing means includes at least one control unit electrically connected between each control station 12 of the electrical operation circuit and each biometric verification system 18, which will prevent control unit from functioning if the identity of an authorized individual cannot be verified.

Moreover, because the preventing means includes at least one control unit electrically connected between each control station 12 of the electrical operation circuit and each biometric verification system 18, if biometric verification system 18 fails to authenticate the identity of the individual responsible for maintaining the electrically operated folding operable wall at any time in which the electrically operated folding operable wall is in operation, the electrically operated folding operable wall will cease to operate (is turned off from an on position).

A restarting means restarts the electrical operation circuit of the folding operable wall after the identity of the individual trained and authorized to maintain the folding operable wall is verified, wherein the restarting means includes a reset control key switch in at least one control unit, which when turned on will reactivate the electrical operation circuit and biometric verification system 18.

To normally close an electrically operated folding operable wall of an electrically operated folding operable wall system that includes an extend control switch 14 and a stack control switch 16, rather than a key switch 22, in accordance with the methods of the present invention, the individual responsible for maintaining the electrically operated folding operable wall must create a new record using biometric verification system 18 in a test phase. In one embodiment, shown in FIG. 1, the individual responsible for maintaining the electrically operated folding operable wall is required to place his or her finger 20 (or an artificial reproduction thereof) on a fingerprint scanner included in biometric verification system 18 in the test phase, which creates a new record of the individual's fingerprint (or an image of the artificial reproduction of a fingerprint from an authorized individual whose fingerprint was recorded in the enrollment phase) and compares the same with fingerprint images in a database included in biometric verification system 18 obtained during an enrollment phase (templates). If the image of the fingerprint in the new record matches a template fingerprint image in the database, the identity of the individual from the enrollment phase is confirmed. Once the individual's identity is confirmed, the operator presses extend control switch 14. Pressing extend control switch 14 will electrically connect extend control switch 14 with control station 12, which will activate the proper control relays and motor. The electrically operated folding operable wall will then close along the operating path and extend to the distal side wall.

To normally open an electrically operated folding operable wall of an electrically operated folding operable wall system that includes an extend control switch 14 and a stack control switch 16, rather than a key switch 22, in accordance with the methods of the present invention, the individual responsible for maintaining the electrically operated folding operable wall must create a new record using biometric verification system 18. As shown in FIG. 1, the individual responsible for maintaining the electrically operated folding operable wall is required to place his or her finger 20 (or an artificial reproduction thereof) on a fingerprint scanner included in biometric verification system 18 to create a new record in a test phase, which captures an image of the individual's fingerprint (or an artificial reproduction thereof) and compares the image of the individual's fingerprint with the with fingerprint images in a database included in biometric verification system 18 obtained during an enrollment phase. If the image of the fingerprint matches in the new record matches a template fingerprint image in the database, the identity of the individual from the enrollment phase is confirmed. Once the individual's identity is confirmed, the individual responsible for maintaining the electrically operated folding operable wall presses stack control switch 16. After stack control switch 16 is pressed, stack control switch 16 will electrically connect through control station 12, which will activate the proper control relays and motor. The electrically operated folding operable wall will then open along the operating path and stack up to the stacked side wall.

If biometric verification system 18 is unable to verify the identity of the individual responsible for maintaining the electrically operated folding operable wall at any time in which the electrically operated folding operable wall is in operation, the preventing means will cause the electrically operated folding operable wall to stop. In particular, if biometric verification system 18 is unable to verify the identity of the individual responsible for maintaining the electrically operated folding operable wall, the preventing means will turn off control station 12, which in turn stops the motor. In order to continue opening or closing the electrically operated folding operable wall, the individual responsible for maintaining the electrically operated folding operable wall is required to follow the appropriate steps, as set forth above. In some embodiments, the individual responsible for maintaining the electrically operated folding operable wall must be in direct contact with control station 12 the entire time the electrically operated folding operable wall is being opened or closed. For example, in some embodiments, the individual must keep his or her finger on the fingerprint sensor while the wall is being opened or closed. That is, if the individual removes his or her finger from the fingerprint sensor, the preventing means will activate to prevent the wall from further opening or closing.

Figure 4:
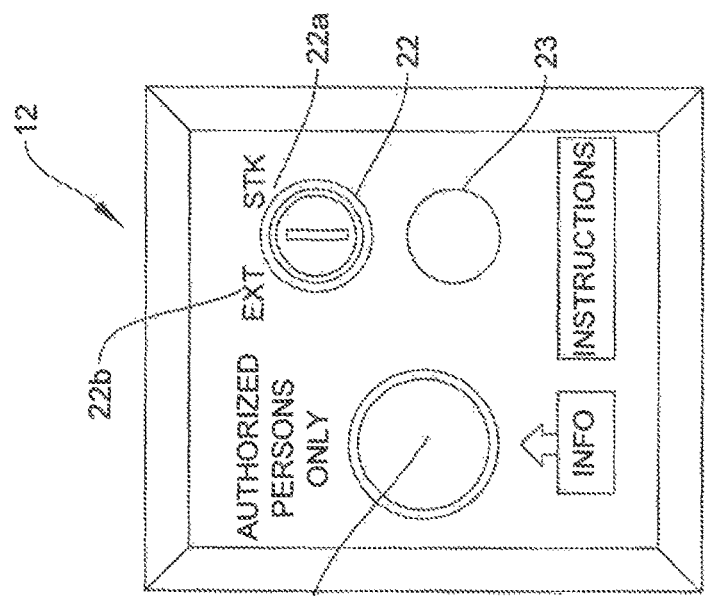
FIG. 4 is a side view of one embodiment of a component of a safety system in accordance with the principles of the present disclosure.

To normally close an electrically operated folding operable wall of an electrically operated folding operable wall system that includes a key switch, rather than an extend control switch 14 and a stack control switch 16, as shown in FIG. 4, in accordance with the methods of the present invention, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator turns key switch 22 to a first position 22a. After key switch 22 is turned to a first position 22a, key switch 22 will electrically connect through control station 12, which will activate the proper control relays and motor. The electrically operated folding operable wall will then close along the operating path and extend to the distal side wall.

In one embodiment, in order to continue opening or closing the electrically operated folding operable wall after the preventing means has caused the electrically operated folding operable wall to stop, the individual responsible for maintaining the electrically operated folding operable wall is required to activate a reset control switch, before following the appropriate steps set forth above for opening and closing.

To normally open an electrically operated folding operable wall of an electrically operated folding operable wall system that includes a key switch, rather than an extend control switch 14 and a stack control switch 16, as shown in FIG. 4, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator turns key switch 22 to a second position 22b. After key switch 22 is turned to a second position 22b, key switch 22 will electrically connect through control station 12, which will activate the proper control relays and motor. The electrically operated folding operable wall will then open along the operating path and stack up to the stacked side wall. Switch 23 is a tamper resistant push button switch for actuation by the finger of a human operator for operation and control as described above in connection with extend control switch 14 and stack control switch 16.

If biometric verification system 18 is unable to verify the identity of the individual responsible for maintaining the electrically operated folding operable wall at any time in which the electrically operated folding operable wall is in operation, the preventing means will cause the electrically operated folding operable wall to stop. In particular, if biometric verification system 18 is unable to verify the identity of the individual responsible for maintaining the electrically operated folding operable wall, the preventing means will turn off control station 12, which in turn stops the motor. In order to continue opening or closing the electrically operated folding operable wall, the individual responsible for maintaining the electrically operated folding operable wall is required to follow the appropriate steps, as set forth above.

Figure 2:
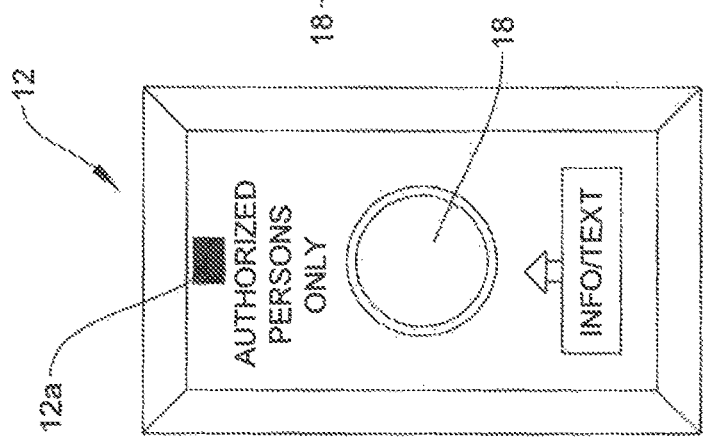
FIG. 2 is a side view of one embodiment of a component of a safety system in accordance with the principles of the present disclosure.

In one embodiment, shown in FIG. 2, control station 12 includes an interface having biometric verification system 18. Control station 12 may be coupled to an existing electrically operated folding operable wall system, such as, for example, an electrically operated folding operable wall system that lacks a biometric verification system to facilitate retrofitting of older equipment. Control station 12 permits operation of an extend control switch and a stack control switch of the existing electrically operated folding operable wall system when authentication of the operator is confirmed, and prevents operation of the extend control switch and the stack control switch when authentication of the operator is not confirmed.

To normally close an electrically operated folding operable wall having such a system, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the individual responsible for maintaining the electrically operated folding operable wall either turns a key switch or presses an extend control switch. Turning the key switch or pressing the extend control switch will electrically connect the key switch or the extend control switch 14 through control station 12, which will activate the proper control relays and motor. The electrically operated folding operable wall will then close along the operating path and extend to the distal side wall.

To normally open an electrically operated folding operable wall having such a system, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator either turns a key switch or presses a stack control switch. Turning the key switch or pressing the stack control switch will electrically connect the key switch or the stack control switch through control station 12, which will activate the proper control relays and motor. The electrically operated folding operable wall will then open along the operating path and stack up to the stacked side wall.

Figure 5:
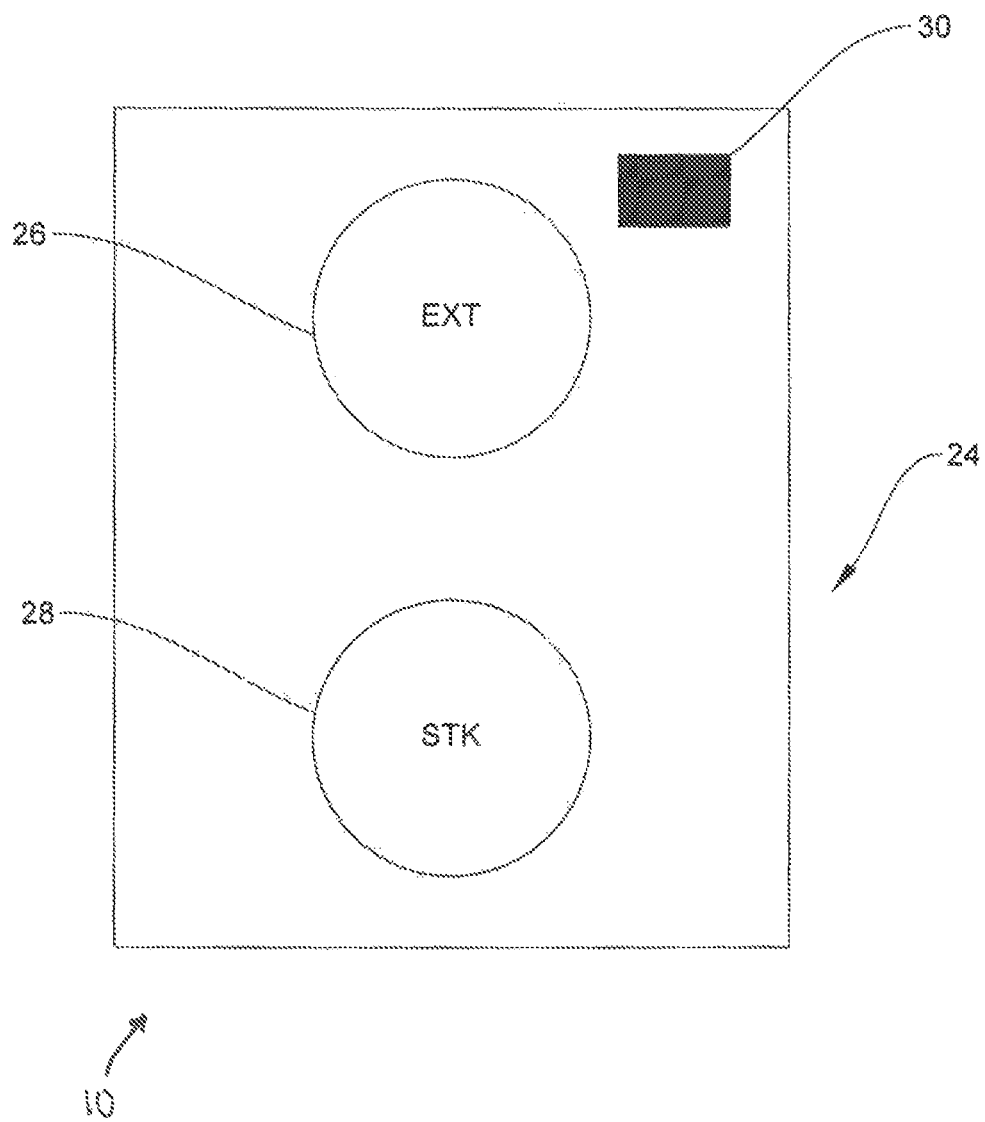
FIG. 5 is a side view of one embodiment of a component of a safety system in accordance with the principles of the present disclosure.

In some embodiments, the control station 12 shown in FIG. 2 may be coupled to a control station, such as, for example, a control station 24, shown in FIG. 5, that lacks a biometric verification system. Control station 24 includes an extend control switch 26 similar to extend control switch 14 and a stack control switch 28 similar to stack control switch 16. Control switch 26 and stack control switch 28 are configured to open and close the electrically operated folding operable wall, similar to extend control switch 14 and stack control switch 16.

In some embodiments, the control station 12 shown in FIG. 2 may be directly wired to control station 24. In such embodiments, the control station 12 will send a signal to control station 24 via a wired connection when authorization of the operator is confirmed to allow extend control switch 26 and/or stack control switch 28 to be actuated to open and close the electrically operated folding operable wall, as discussed herein. In such embodiments, control station 12 will not send the signal to control station 24 unless and until authorization of the operator is confirmed, which prevents control switch 26 and/or stack control switch 28 from being actuated to open and close the electrically operated folding operable wall unless and until authorization of the operator is confirmed.

In some embodiments, the control station 12 shown in FIG. 2 may wirelessly couple to control station 24. For example, in some embodiments, the control station 12 shown in FIG. 2 may include a sensor 12a configured to send a signal to a sensor 30 of control station 24 when authorization of the operator is confirmed to allow extend control switch 26 and/or stack control switch 28 to be actuated to open and close the electrically operated folding operable wall, as discussed herein. In such embodiments, sensor 12a will not send the signal to sensor 30 of control station 24 unless and until authorization of the operator is confirmed, which prevents control switch 26 and/or stack control switch 28 from being actuated to open and close the electrically operated folding operable wall unless and until authorization of the operator is confirmed.

Figure 6:
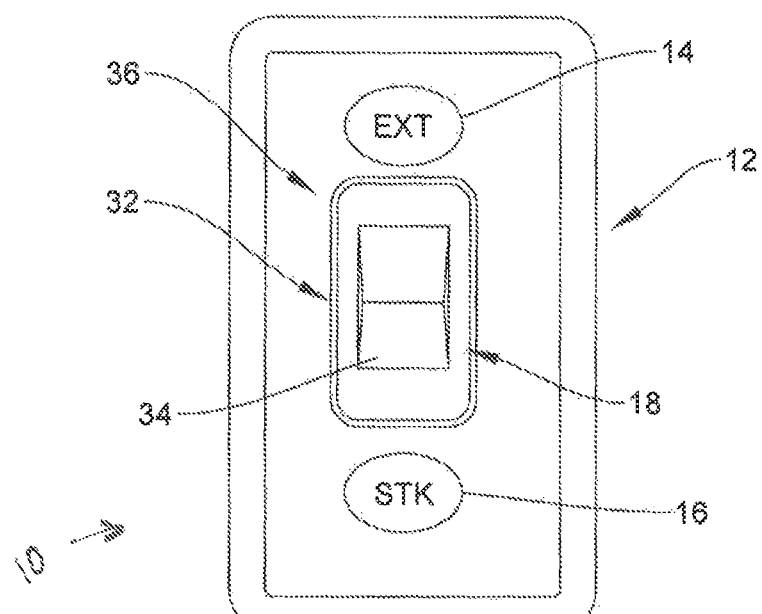
FIG. 6 is a side view of one embodiment of a component of a safety system in accordance with the principles of the present disclosure.

In one embodiment, shown in FIG. 6, biometric verification system 18 of control station 12 includes a fingerprint scanner 32 incorporated directly into control station 12. Fingerprint scanner 32 includes a tray 34 that is accessible by rotating a flap 36 relative to a face of control station 12. To operate the electrically operated folding operable wall, a user rotates flap 36 relative to the face of control station 12 to move flap 36 from a closed orientation in which tray 34 is not accessible to an open configuration in which tray 34 is accessible. The user then presses one or more of his or her fingers, such as, for example, finger 20 against tray 34. Pressing one or more of the user's fingers against tray 34 causes fingerprint scanner 32 to scan the user's finger(s) that is/are pressed against tray 34 to create one or more fingerprint images and create a new record of the one or more fingerprint images. Fingerprint scanner 32 and/or biometric verification system 18 will then compare the fingerprint images obtained by fingerprint scanner 32 (the new record) with fingerprint images in a database in biometric verification system 18 that were obtained during an enrollment phase (templates). If the image(s) of the fingerprint(s) in the new record match a template fingerprint image in the database, the identity of the individual from the enrollment phase is confirmed. Once the individual's identity is confirmed, the operator may press extend control switch 14 and/or stack control switch 16 to open or close the electrically operated folding operable wall. If the image(s) of the fingerprint(s) in the new record do not match a template fingerprint image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 7:
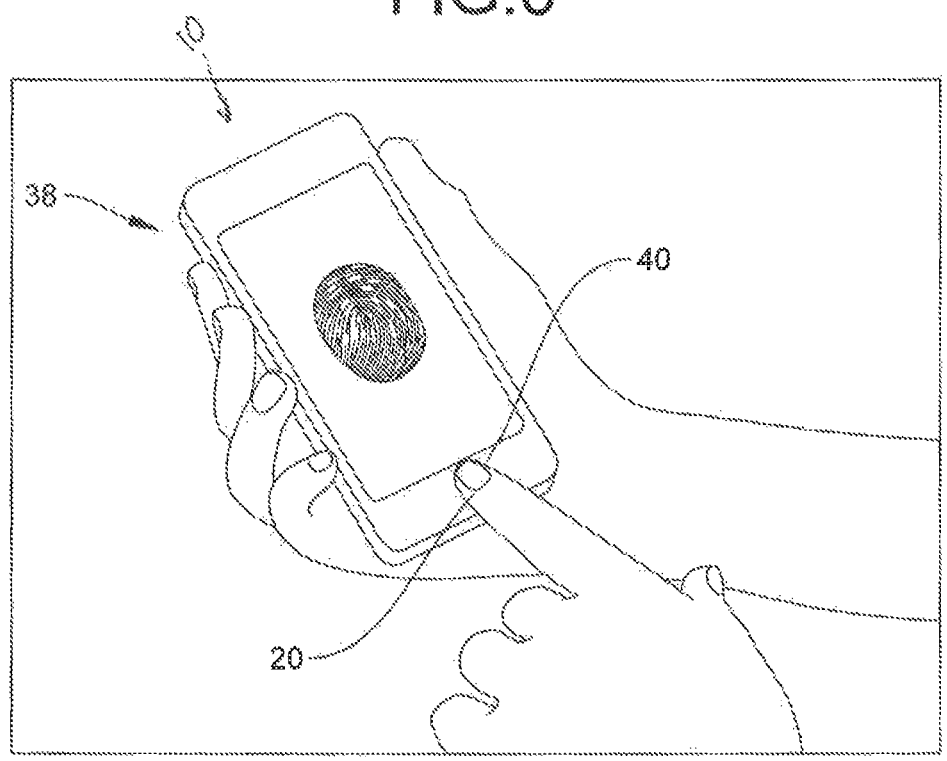
FIG. 7 is a perspective view of a device compatible with a safety system in accordance with the principles of the present disclosure.

In one embodiment, shown in FIG. 7, system 10 includes a handheld device, such as, for example, a tablet or smartphone 38 that includes a fingerprint scanner 40. In some embodiments, smartphone 38 includes an application and/or software that is compatible with fingerprint scanner 40. Smartphone 38 further includes a sensor that is configured to send a signal to a sensor, such as, for example, sensor 30 of the control station 12 shown in FIG. 5. In some embodiments, smartphone 38 is configured to display an image of a fingerprint obtained by fingerprint scanner 40 on a screen of smartphone 38, as shown in FIG. 7. Pressing one or more of the user's fingers against fingerprint scanner 40 causes fingerprint scanner 40 to scan the user's finger(s) that is/are pressed against fingerprint scanner 40 to create one or more fingerprint images and create a new record of the one or more fingerprint images. Smartphone 38 includes a processor that compares the new record with fingerprint images in a database that were obtained during an enrollment phase (templates). If the image(s) of the fingerprint(s) in the new record match a template fingerprint image in the database, the identity of the individual from the enrollment phase is confirmed. Once the individual's identity is confirmed, the sensor of smartphone 38 will send a signal to sensor 30 to allow the operator to press extend control switch 14 and/or stack control switch 16 to open or close the electrically operated folding operable wall. However, if the individual's identity is not confirmed, the sensor of smartphone 38 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 38 sends a signal to sensor 30.

Figure 8:
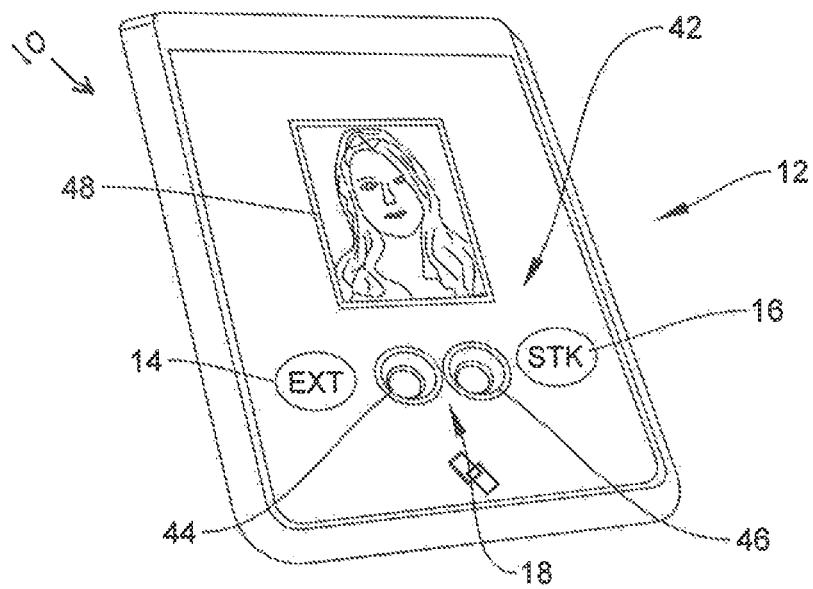
FIG. 8 is a perspective view of one embodiment of a component of a safety system in accordance with the principles of the present disclosure.

In one embodiment, shown in FIG. 8, biometric verification system 18 of control station 12 includes a face scanner 42 incorporated directly into control station 12. Face scanner 42 includes a first camera 44. In some embodiments, face scanner 42 also includes a second camera 46. Camera 44 and/or camera 46 are configured to take an image of a person's face and display the image of the person's face on a display 48. Face scanner 42 includes a processor configured to compare the image of the person's face taken by camera 44 and/or camera 46 with facial images in a database. To operate the electrically operated folding operable wall, a user positions his or her face in front of camera 44 and/or camera 46, which capture an image of the user's face to create one or more facial images and create a new record of the one or more facial images. Face scanner 42 and/or biometric verification system 18 will then compare the facial images obtained by face scanner 42 (the new record) with facial images in a database in biometric verification system 18 that were obtained during an enrollment phase (templates). If the image(s) of the face in the new record match a template facial image in the database, the identity of the individual from the enrollment phase is confirmed. Once the individual's identity is confirmed, the operator may press extend control switch 14 and/or stack control switch 16 to open or close the electrically operated folding operable wall. If the image(s) of the face in the new record do not match a template facial image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 9:
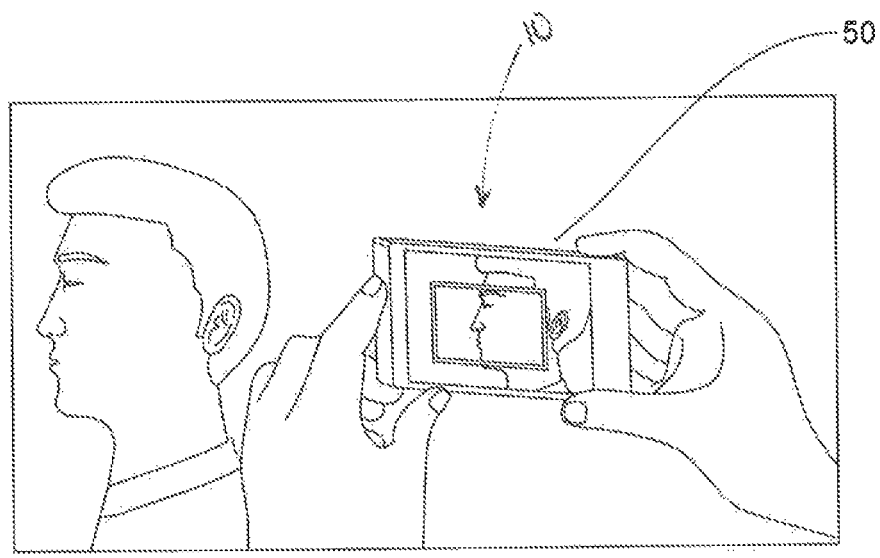
FIG. 9 is a perspective view of a device compatible with a safety system in accordance with the principles of the present disclosure.

In one embodiment, shown in FIG. 9, system 10 includes a handheld device, such as, for example, a tablet or smartphone 50 that includes a camera and a processor configured to create facial images taken by the camera. Smartphone 50 further includes a sensor that is configured to send a signal to a sensor, such as, for example, sensor 30 of the control station 12 shown in FIG. 5. In some embodiments, smartphone 50 is configured to display a facial image obtained by the camera on a screen of smartphone 50, as shown in FIG. 9. The camera captures one or more facial images and the processor of smartphone 50 creates a new record of the one or more facial images. The processor of smartphone 50 compares the new record with facial images in a database that were obtained during an enrollment phase (templates). If the facial image(s) in the new record match a template facial image in the database, the identity of the individual from the enrollment phase is confirmed. Once the individual's identity is confirmed, the sensor of smartphone 50 will send a signal to sensor 30 to allow the operator to press extend control switch 14 and/or stack control switch 16 to open or close the electrically operated folding operable wall. However, if the individual's identity is not confirmed, the sensor of smartphone 50 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 50 sends a signal to sensor 30.

Figure 10:
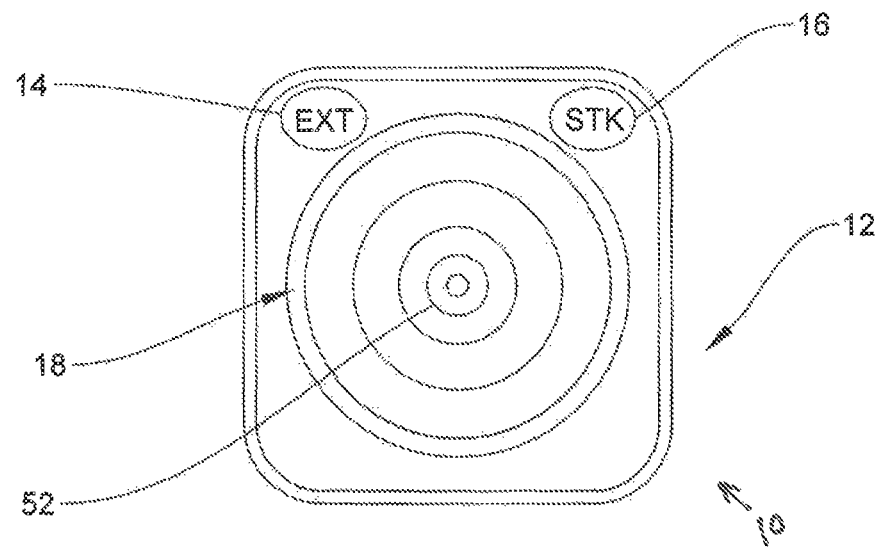
FIG. 10 is a side view of one embodiment of a component of a safety system in accordance with the principles of the present disclosure.

In one embodiment, shown in FIG. 10, biometric verification system 18 of control station 12 includes a retina scanner 52 incorporated directly into control station 12. Retina scanner 52 includes a camera configured to take an image of a person's retina. Retina scanner 52 includes a processor configured to compare the image of the person's retina taken by the camera with images of retinas in a database. To operate the electrically operated folding operable wall, a user positions his or her face in front of the camera, which captures an image of the user's retina to create one or more retina images and create a new record of the one or more retina images. Retina scanner 52 and/or biometric verification system 18 will then compare the retina images obtained by the camera (the new record) with retina images in a database in biometric verification system 18 that were obtained during an enrollment phase (templates). If the image(s) of the retina in the new record match a template retina image in the database, the identity of the individual from the enrollment phase is confirmed. Once the individual's identity is confirmed, the operator may press extend control switch 14 and/or stack control switch 16 to open or close the electrically operated folding operable wall. If the image(s) of the retina in the new record do not match a template retina image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 11:
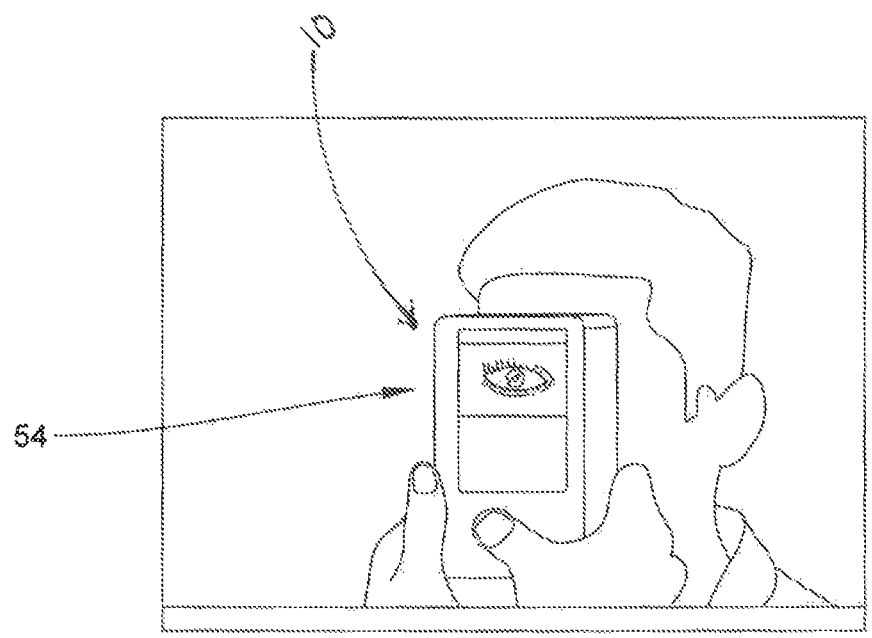
FIG. 11 is a perspective view of a device compatible with a safety system in accordance with the principles of the present disclosure.

In one embodiment, shown in FIG. 11, system 10 includes a handheld device, such as, for example, a tablet or smartphone 54 that includes a camera and a processor configured to create one or more retina images taken by the camera. Smartphone 54 further includes a sensor that is configured to send a signal to a sensor, such as, for example, sensor 30 of the control station 12 shown in FIG. 5. In some embodiments, smartphone 54 is configured to display a retina image obtained by the camera on a screen of smartphone 54, as shown in FIG. 11. The camera captures one or more retina images and the processor of smartphone 54 creates a new record of the one or more retina images. The processor of smartphone 54 compares the new record with retina images in a database that were obtained during an enrollment phase (templates). If the retina image(s) in the new record match a template retina image in the database, the identity of the individual from the enrollment phase is confirmed. Once the individual's identity is confirmed, the sensor of smartphone 54 will send a signal to sensor 30 to allow the operator to press extend control switch 14 and/or stack control switch 16 to open or close the electrically operated folding operable wall. However, if the individual's identity is not confirmed, the sensor of smartphone 54 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 54 sends a signal to sensor 30.

Figure 12:
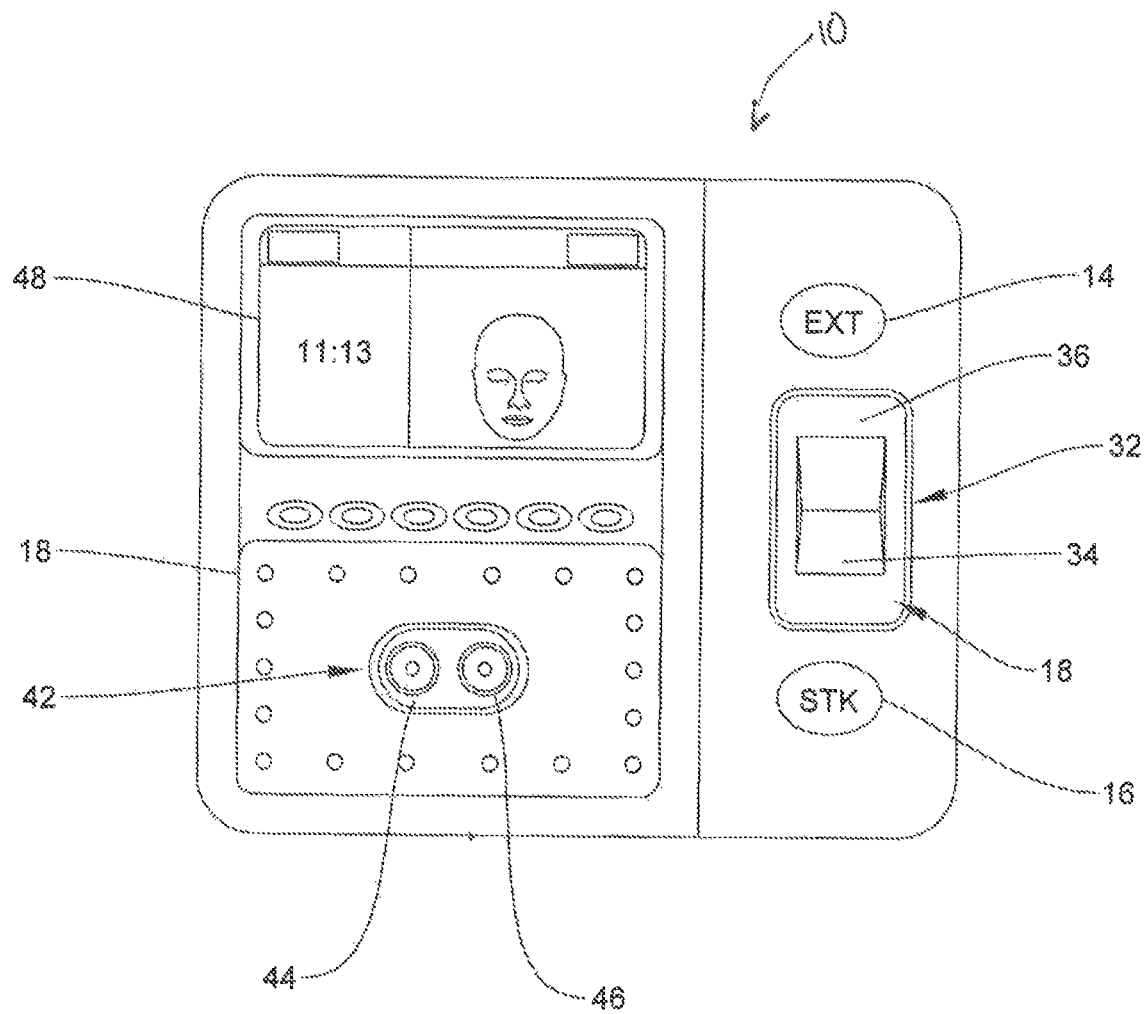
FIG. 12 is a side view of one embodiment of a component of a safety system in accordance with the principles of the present disclosure.

In one embodiment, shown in FIG. 12, biometric verification system 18 of control station 12 includes a two or more scanners/systems incorporated directly into control station 12. As shown in FIG. 12, control station 12 includes a fingerprint scanner 32 and a facial scanner 42 incorporated directly into control station 12. However, it is envisioned that control station 12 may include two or more of any of the scanners/systems discussed herein. For example, control station 12 may include a fingerprint scanner, such as, for example, fingerprint scanner 32, a facial scanner, such as, for example, facial scanner 42, a retina scanner, such as, for example, retina scanner 52, an earlobe geometry recognition system, a hand geometry recognition system, an iris recognition system, a voice recognition system, a signature recognition system and/or a key stroke recognition system. In some embodiments, an individual's identity must be confirmed using at least two scanners/systems before the individual can open or close the electrically operated folding operable wall. For example, fingerprint scanner 32 and/or biometric verification system 18 will compare fingerprint images obtained by fingerprint scanner 32 (the new record) with fingerprint images in a database in biometric verification system 18 that were obtained during an enrollment phase (templates). If the image(s) of the fingerprint(s) in the new record match a template fingerprint image in the database, face scanner 42 and/or biometric verification system 18 will then compare the facial images obtained by face scanner 42 (the new record) with facial images in a database in biometric verification system 18 that were obtained during an enrollment phase (templates). If the image(s) of the face in the new record match a template facial image in the database, the identity of the individual from the enrollment phase is confirmed. Once the individual's identity is confirmed, the operator may press extend control switch 14 and/or stack control switch 16 to open or close the electrically operated folding operable wall. If the image(s) of the face in the new record do not match a template facial image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed. It is envisioned that the order of the verification systems can be reversed. For example, the identity of the individual may be confirmed by face scanner 42 before the individual's identity is confirmed by fingerprint scanner 32.

Figure 13:
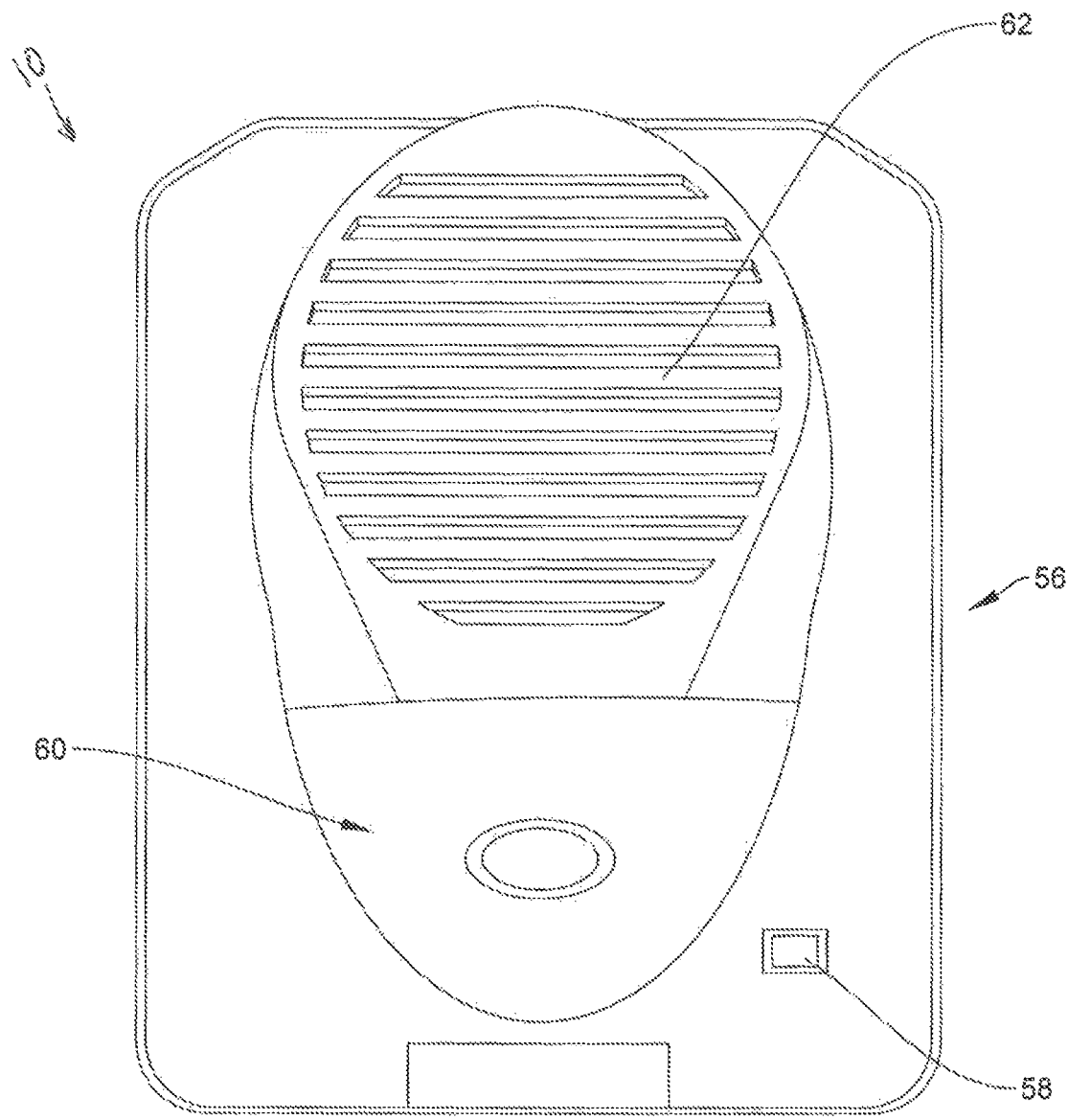
FIG. 13 is a perspective view of a device compatible with a safety system in accordance with the principles of the present disclosure.

In one embodiment, shown in FIG. 13, the control stations 12 discussed above may wirelessly couple to an alarm, such as, for example, a horn strobe 56 configured to notify persons in the same room and/or area as the electrically operated folding operable wall that the electrically operated folding operable wall is being opened and/or closed. For example, in some embodiments, the control stations 12 discussed above may include a sensor, such as, for example, sensor 12a configured to send a signal to a sensor 58 of horn strobe 56 when authorization of the operator is confirmed to allow extend control switch 26 and/or stack control switch 28 to be actuated to open and close the electrically operated folding operable wall, as discussed herein. In such embodiments, sensor 12a will not send the signal to sensor 58 unless and until authorization of the operator is confirmed, which prevents control switch 26 and/or stack control switch 28 from being actuated to open and close the electrically operated folding operable wall unless and until authorization of the operator is confirmed. In some embodiments, when authorization of the operator is confirmed, sensor 12a will send the signal to sensor 58 and a strobe 60 of horn strobe 56 will provide flashes of light intermittently and/or a speaker 62 of horn strobe 56 will produce a loud sound to notify persons in the same room and/or area as the electrically operated folding operable wall that the electrically operated folding operable wall is being opened and/or closed.

In some embodiments, strobe 60 will provide flashes of light intermittently and/or a speaker 62 will produce a loud sound before the electrically operated folding operable wall begins to open or close. For example, strobe 60 can provide flashes of light intermittently and/or a speaker 62 can produce a loud sound for a selected amount of time, such as, for example, one or more minutes before the electrically operated folding operable wall begins to open or close. This will provide people in a path of the electrically operated folding operable wall to exit the path of the electrically operated folding operable wall before the electrically operated folding operable wall begins to open or close. In some embodiments, strobe 60 will provide flashes of light intermittently and/or a speaker 62 will produce a loud sound until the electrically operated folding operable wall is fully opened or closed and strobe 60 and/or speaker 62 will cease to provide intermittent flashes of light and/or a loud noise once the electrically operated folding operable wall is fully opened or closed. In some embodiments, strobe 60 will continue to provide flashes of light intermittently and/or a speaker 62 will continue to produce a loud sound for a period of time, such as, for example, one or more minutes after the electrically operated folding operable wall is fully opened or closed.

Figure 14:
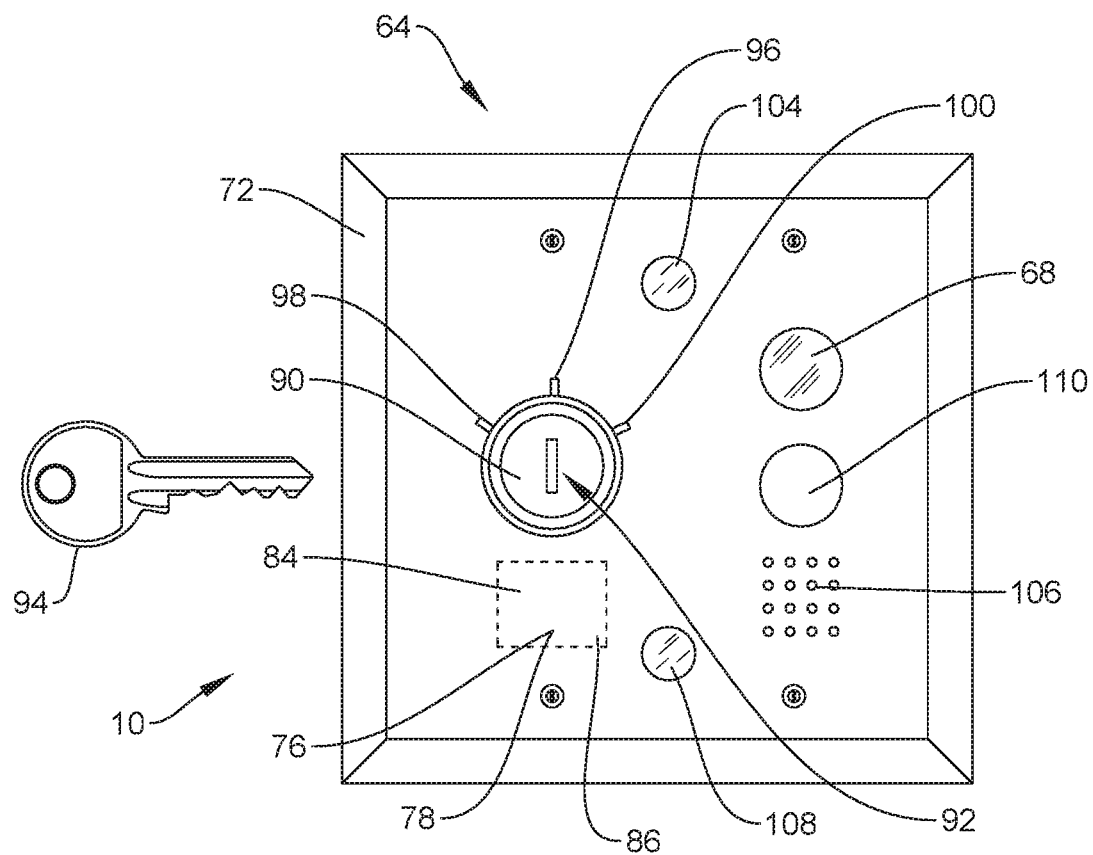
FIG. 14 is a side view of one embodiment of components of a safety system in accordance with the principles of the present disclosure.
Figure 15:
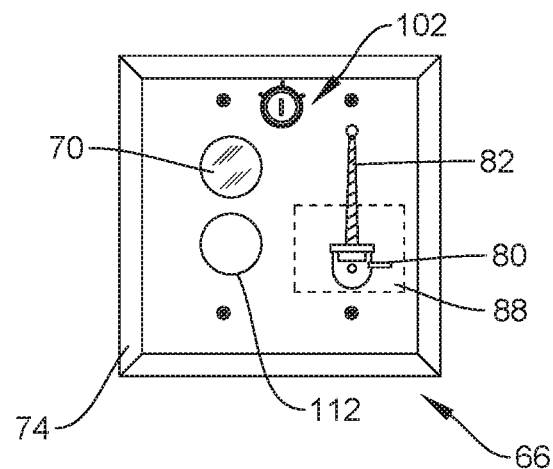
FIG. 15 is a side view of one embodiment of a component of a safety system in accordance with the principles of the present disclosure.

In one embodiment, shown in FIGS. 14 and 15, system 10 includes a control station 64 and a control station 66. Control stations 64, 66 are similar to control station(s) 12 and together are configured to control movement of an electrically operated folding operable wall. Control station 64 is spaced apart from control station 66. In some embodiments, control station 64 is positioned at a first end of the folding wall and control station 66 is positioned at an opposite second end of the folding wall. In some embodiments, control station 64 is located at an area that allows for visualization of danger areas that are not visible from a location where control station 66 is located and/or control station 66 is located at an area that allows for visualization of danger areas that are not visible from a location where control station 64 is located. This increases the likelihood that all danger areas are being watched during operation of the folding wall to allow one or more operators to prevent the folding wall from operating if a person or object is visually present in one or more of the danger areas. In some embodiments, control station 64 is located at an area that is not visible from a location where control station 66 is located.

Control station 64 and control station 66 each include safety features that require the presence of a first individual at control station 64 and the presence of a second individual at control station 66 simultaneously in order to operate the folding wall. That is, the folding wall is unable to operate unless and until the first individual is physically present at control station 64 and the second individual is physically present at control station 66 at the same time the first individual is physically present at control station 64. Indeed, if one of the individuals leaves control station 64 or control station 66, the folding wall will stop operating, as discussed herein.

Control station 64 includes a device, such as, for example, a sensor 68. In some embodiments, sensor 68 includes a capacitance sensor and/or fingerprint sensor configured to detect touches by fingers and/or other body parts. In some embodiments, sensor 68 includes at least one sensing conductor and detection circuitry for detecting a capacitive influence on the sensing conductor when oscillating electrical energy is applied, the capacitive influence being interpreted as a touch. In some embodiments, sensor 68 is configured to transmit a probing signal, such as, for example, comprising a series of probing pulses, to a fingerprint sensing area. A response signal that includes a series of response pulses is received from the fingerprint sensing area in response to the probing signal. A reference signal is generated and fingerprint activity is detected on the fingerprint sensing area. In some embodiments, sensor 68 is a fingerprint swipe sensor and is coupled to a means for generating a control signal. The sensor is configured to sense an image corresponding to a fingerprint and translate the image into image data. The means for generating a control signal generates a control signal if statistics of the image data exceed a pre-determined number of threshold levels.

Control station 66 includes a device, such as, for example, a sensor 70. In some embodiments, sensor is a capacitance sensor and/or fingerprint sensor configured to detect touches by fingers and/or other body parts. In some embodiments, sensor 70 includes at least one sensing conductor and detection circuitry for detecting a capacitive influence on the sensing conductor when oscillating electrical energy is applied, the capacitive influence being interpreted as a touch. In some embodiments, sensor 70 is configured to transmit a probing signal, such as, for example, comprising a series of probing pulses, to a fingerprint sensing area. A response signal that includes a series of response pulses is received from the fingerprint sensing area in response to the probing signal. A reference signal is generated and fingerprint activity is detected on the fingerprint sensing area. In some embodiments, sensor 70 is a fingerprint swipe sensor and is coupled to a means for generating a control signal. The sensor is configured to sense an image corresponding to a fingerprint and translate the image into image data. The means for generating a control signal generates a control signal if statistics of the image data exceed a pre-determined number of threshold levels.

In some embodiments, control station 64 and/or control station 66 is/are configured to replace an existing control switch configured to operate an existing folding door. In some embodiments, control station 64 and/or control station 66 is/are configured to retrofit into an existing electrical box. In some embodiments, control station 64 and/or control station 66 is/are configured to fit within a single gang (1 gang) receptacle. In some embodiments, control station 64 and/or control station 66 is/are configured to fit within a double gang (2 gang) receptacle. This avoids the need to replace the electrical boxes. That is, existing control switches can be removed from the existing electrical boxes and replaced with control station 64 and/or control station 66 without having to replace the existing electrical boxes. In some embodiments, control station 64 and/or control station 66 is/are incorporated directly into the folding wall. That is, at least a portion of control station 64 and/or control station 66 is/are positioned within a thickness of the folding wall. For example, control station 64 can be fixed to a first panel of the folding wall and control station 66 can be fixed to a second panel of the folding wall that is movable relative to the first panel of the folding wall.

Control station 64 is in communication with control station 66 such that control station 64 can detect if sensor 70 detects a finger or other body part in contact with sensor 70 and/or control station 66 can detect if sensor 68 detects a finger or other body part in contact with sensor 68. In some embodiments, control station 64 is wired directly to control station 66. That is, there is a wire that extends from control station 64 to control station 66 to allow control station 64 to communicate with control station 66. In some embodiments, control station 64 is wired in series with control station 66.

In some embodiments, control station 64 is in wireless communication with control station 66. In some embodiments, control station 64 includes a receiver 76 that is configured to communicate with control station 66. In some embodiments, receiver 76 includes an antenna 78 that is configured to receive one or more signals from a transmitter 80 of control station 66 that are indicative of whether or not sensor 70 detects a finger or other body part in contact with sensor 70. Likewise, control station 66 includes an antenna 82 configured to receive one or more signals from a transmitter 84 of control station 64 that are indicative of whether or not sensor 68 detects a finger or other body part in contact with sensor 68. In some embodiments, control station 64 and/or control station 66 are hardwired to a power source to avoid the need for a battery. In some embodiments, where direct connection to a power source is not available or is not preferable, control station 64 includes a battery 86 configured to provide power to the components of control station 64 and/or control station 66 includes a battery 88 configured to provide power to the components of control station 66.

Control stations 64, 66 allow movement of the folding wall if sensor 68 detects that a first object, such as, for example, a finger or other body part of a first individual is in direct contact with a surface of sensor 68, such as, for example, a touch pad and/or capacitance sensor of sensor 68 and sensor 70 detects that a second object, such as, for example, a finger or other body part of a second individual is in direct contact with a surface of sensor 70, such as, for example, a touch pad and/or capacitance sensor of sensor 70. In some embodiments, control station 64 and/or control station 66 include buttons, switches or other devices that are operable to move the folding wall after sensor 68 detects that the first object is in direct contact with a surface of sensor 68 and sensor 70 detects that the second object is in direct contact with a surface of sensor 70. If sensor 68 detects that the first object is not in direct contact with a surface of sensor 68 and/or sensor 70 detects that the second object is not in direct contact with a surface of sensor 70, the folding wall will become inoperable. That is, the buttons, switches or other devices will become inoperable to move the folding wall if sensor 68 detects that the first object is not in direct contact with a surface of sensor 68 and/or sensor 70 detects that the second object is not in direct contact with a surface of sensor 70.

In some embodiments, the buttons, switches or other devices of control station 64 include a key switch, such as, for example, a selector switch 90, as shown in FIG. 14, that is the same or similar to key switch 22 discussed herein. Switch 90 includes a keyhole 92 configured for disposal of a portion of a key 94 such that key can be turned to move switch 90 from a first position, such as, for example, an off position 96 to a second position, such as, for example, a reverse position 98, or a third position, such as, for example, a forward position 100. In some embodiments, the folding wall moves to stack panels of the folding wall when switch 90 is in position 98 and the folding wall moves to extend the panels of the folding wall when switch 90 is position 100. In some embodiments, the folding wall moves to extend the panels of the folding wall when switch 90 is in the second position and the folding wall moves to stack the panels of the folding wall when switch 90 is in the third position. In some embodiments, switch 90 is prevented from moving from position 96 to position 98 or from position 96 to position 100 unless and until sensor 68 detects that the first object is in direct contact with a surface of sensor 68 and sensor 70 detects that the second object is in direct contact with a surface of sensor 70. If switch 90 is in position 98 or position 100 and sensor 68 fails to detect that the first object is in direct contact with a surface of sensor and sensor 70 fails to detect that the second object is in direct contact with a surface of sensor 70, the folding wall will stop moving, despite switch being in position 98 or position 100.

In some embodiments, the buttons, switches or other devices of control station 64 include an extend control switch that is the same or similar to extend control switch 14 or extend control switch 26 and a stack control switch that is the same or similar to stack control switch 16 or stack control switch 28 in place of or in addition to switch 90. However, it is envisioned that control station 64 may include any type of button, switch or other device that is/are operable to move the folding wall after sensor 68 detects that the first object is in direct contact with a surface of sensor 68 and sensor 70 detects that the second object is in direct contact with a surface of sensor 70.

In some embodiments, control station 64 includes buttons, switches or other devices, such as, for example, switch 90 that is/are operable to move the folding wall after sensor 68 detects that the first object is in direct contact with a surface of sensor 68 and sensor 70 detects that the second object is in direct contact with a surface of sensor 70 and control station 66 does not include any buttons, switches or other devices that are operable to move the folding wall after sensor 68 detects that the first object is in direct contact with a surface of sensor 68 and sensor 70 detects that the second object is in direct contact with a surface of sensor 70. In such embodiments, the buttons, switches or other devices of control station 64 must be operable in order to move the folding wall after sensor 68 detects that the first object is in direct contact with a surface of sensor 68 and sensor 70 detects that the second object is in direct contact with a surface of sensor 70. That is, control station 66 lacks any means to start or stop the folding wall from moving after sensor 68 detects that the first object is in direct contact with a surface of sensor 68 and sensor 70 detects that the second object is in direct contact with a surface of sensor 70.

In some embodiments, control station 64 includes buttons, switches or other devices, such as, for example, switch 90 that is/are operable to move the folding wall after sensor 68 detects that the first object is in direct contact with a surface of sensor 68 and sensor 70 detects that the second object is in direct contact with a surface of sensor 70 and control station 66 include any buttons, switches or other devices, such as, for example a switch 102 that is the same or similar to switch 90. Switch 102 is operable to move the folding wall after sensor 68 detects that the first object is in direct contact with a surface of sensor 68 and sensor 70 detects that the second object is in direct contact with a surface of sensor 70. In such embodiments, the folding wall can be moved using switch 90 or switch 102 after sensor 68 detects that the first object is in direct contact with a surface of sensor 68 and sensor 70 detects that the second object is in direct contact with a surface of sensor 70. That is, control station 64 and control station 66 each include means to start the folding wall moving after sensor 68 detects that the first object is in direct contact with a surface of sensor 68 and sensor 70 detects that the second object is in direct contact with a surface of sensor 70.

In some embodiments, control station 64 includes a camera 104 configured to capture images adjacent to control station 64. In some embodiments, camera 104 is configured to capture images of an individual that is operating the folding wall in order to verify that the individual is authorized to operate the folding wall and/or to identify which individual was operating the folding wall during an event, such as, for example, an accident wherein a person is injured during the operation of the folding wall. In some embodiments, camera 104 is configured to activate a video recording at all times the folding wall is being operated. For example, camera 104 will activate the video recording as soon as sensor 68 detects that the first object is in direct contact with a surface of sensor 68 and sensor 70 detects that the second object is in direct contact with a surface of sensor 70 and will stop the video recording as soon as sensor 68 fails to detect that the first object is in direct contact with a surface of sensor 68 or sensor 70 fails to detect that the second object is in direct contact with a surface of sensor 70.

In some embodiments, control station 64 includes a speaker 106 configured to sound an audible alert during operation of the folding door. In some embodiments, speaker 106 is configured to activate an audible alert at all times the folding wall is being operated. For example, speaker will activate an audible alert as soon as sensor 68 detects that the first object is in direct contact with a surface of sensor 68 and sensor 70 detects that the second object is in direct contact with a surface of sensor 70 and will stop the audio alert as soon as sensor 68 fails to detect that the first object is in direct contact with a surface of sensor 68 or sensor 70 fails to detect that the second object is in direct contact with a surface of sensor 70.

In some embodiments, control station 64 includes a sensor, such as, for example, a motion sensor 108 configured to sound an audible alert during operation of the folding door. In some embodiments, sensor 108 incorporates incorporate passive infrared (PIR) technology and/or microwave (MW) technology to detect masking attempts, such as, for example, if an individual who is not authorized to operate the folding door attempts to defeat sensor 108 by blocking sensor 108 with a material that blocks infrared energy. This prevents an individual who is not authorized to operate the folding door to defeat sensor 108 by blocking sensor 108 with a material that blocks infrared energy when the folding wall is not being used and then later return to operate the folding door. In some embodiments, if sensor 108 detects a masking attempt, sensor 108 will communicate with components of system 10 to make the folding wall inoperable until system 10 can be reset by an authorized individual.

In some embodiments, system 10 requires that an individual operating control station 64 and/or an individual operating control station 66 be verified before the folding wall is operable, similar to the embodiments that include biometric verification system 18. In particular, control station 64 can include a biometric verification system 110 that is the same or similar to biometric verification system 18 and/or control station 66 can include a biometric verification system 112 that is the same or similar to biometric verification system 18. In this embodiment, the identify of an individual operating control station 64 and/or the identity of an individual operating control station 66 must be verified. After the identify of an individual operating control station 64 and/or the identity of an individual operating control station 66 is/are verified, sensor 68 will attempt to detect whether or not the first object is in direct contact with a surface of sensor 68 and sensor 70 will attempt to detect whether the second object is in direct contact with a surface of sensor 70. If sensor 68 detects that the first object is in direct contact with a surface of sensor 68 and sensor 70 detects that the second object is in direct contact with a surface of sensor 70 after the identify of an individual operating control station 64 and/or the identity of an individual operating control station 66 is/are verified, the folding wall will become operable via buttons, switches or other devices on control station 64 and/or buttons, switches or other devices on control station 66. This prevents an unauthorized individual from operating the folding wall and prevents a verified authorized individual from leaving control station 64 and/or control station 66 during operation of the folding wall and/or prevents a verified authorized individual from turning control of control station 64 and/or control station 66 to an unauthorized individual during operation of the folding wall.

To normally close the folding wall, an authorized individual responsible for operating control station 64 must create a new record using biometric verification system 110 and/or an authorized individual responsible for operating control station 66 must create a new record using biometric verification system 112. For example, the authorized individual responsible for operating control station 64 wall may be required to place his or her finger (or an artificial reproduction thereof) on a fingerprint scanner included in biometric verification system 110 in a test phase, which captures an image of the individual's fingerprint and compares the image of the individual's fingerprint with the with fingerprint images in a database included in biometric verification system 110 obtained during an enrollment phase. If the image of the fingerprint in the new record matches a template fingerprint image in the database, the identity of the individual from the enrollment phase is confirmed. Likewise, the authorized individual responsible for operating control station 66 wall may be required to place his or her finger (or an artificial reproduction thereof) on a fingerprint scanner included in biometric verification system 112 in a test phase, which captures an image of the individual's fingerprint and compares the image of the individual's fingerprint with the with fingerprint images in a database included in biometric verification system 112 obtained during an enrollment phase. If the image of the fingerprint in the new record matches a template fingerprint image in the database, the identity of the individual from the enrollment phase is confirmed.

Once the identity of the authorized individual responsible for operating control station 64 and/or the identity of the authorized individual responsible for operating control station 66 is confirmed, sensor 68 will attempt to detect whether or not the first object is in direct contact with a surface of sensor 68 and sensor 70 will attempt to detect whether the second object is in direct contact with a surface of sensor 70. If sensor 68 detects that the first object is in direct contact with a surface of sensor 68 and sensor 70 detects that the second object is in direct contact with a surface of sensor 70 after the identify of an authorized individual who is responsible for operating control station 64 and/or the identity of an authorized individual that is responsible operating control station 66 is/are verified, the folding wall will become operable via buttons, switches or other devices on control station 64 and/or buttons, switches or other devices on control station 66 to close the folding wall. For example, one or both of the individuals can turn a key switch or press an extend control switch, wherein turning the key switch or pressing the extend control switch will electrically connect the key switch or the extend control switch through control station 64, which will activate the proper control relays and motor. The folding wall will then close along the operating path.

To normally open the folding operable wall, an authorized individual responsible for operating control station 64 must create a new record using biometric verification system 110 and/or an authorized individual responsible for operating control station 66 must create a new record using biometric verification system 112. For example, the authorized individual responsible for operating control station 64 wall may be required to place his or her finger (or an artificial reproduction thereof) on a fingerprint scanner included in biometric verification system 110 in a test phase, which captures an image of the individual's fingerprint and compares the image of the individual's fingerprint with the with fingerprint images in a database included in biometric verification system 110 obtained during an enrollment phase. If the image of the fingerprint in the new record matches a template fingerprint image in the database, the identity of the individual from the enrollment phase is confirmed. Likewise, the authorized individual responsible for operating control station 66 wall may be required to place his or her finger (or an artificial reproduction thereof) on a fingerprint scanner included in biometric verification system 112 in a test phase, which captures an image of the individual's fingerprint and compares the image of the individual's fingerprint with the with fingerprint images in a database included in biometric verification system 112 obtained during an enrollment phase. If the image of the fingerprint in the new record matches a template fingerprint image in the database, the identity of the individual from the enrollment phase is confirmed.

Once the identity of the authorized individual responsible for operating control station 64 and/or the identity of the authorized individual responsible for operating control station 66 is confirmed, sensor 68 will attempt to detect whether or not the first object is in direct contact with a surface of sensor 68 and sensor 70 will attempt to detect whether the second object is in direct contact with a surface of sensor 70. If sensor 68 detects that the first object is in direct contact with a surface of sensor 68 and sensor 70 detects that the second object is in direct contact with a surface of sensor 70 after the identify of an authorized individual who is responsible for operating control station 64 and/or the identity of an authorized individual that is responsible operating control station 66 is/are verified, the folding wall will become operable via buttons, switches or other devices on control station 64 and/or buttons, switches or other devices on control station 66 to close the folding wall. For example, one or both of the individuals can turn a key switch or press an extend control switch, wherein turning the key switch or pressing the extend control switch will electrically connect the key switch or the extend control switch through control station 64, which will activate the proper control relays and motor. The folding wall will then closed along the operating path.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method comprising:
   providing a first control station and a second control station, the control stations being configured to control movement of a structure, the first control station comprising a first device, the second station comprising a second device;
   allowing movement of the structure if the second device detects a first object and the second device detects a second object; and preventing movement of the structure if the first device fails to detect the first object, or the second device fails to detect the second object, wherein the second control station is spaced apart from the first control station and is in wireless communication with the first control station.

2. The method recited in claim 1, wherein the devices are sensors configured to detect touches by a body part and the objects are body parts.

3. The method recited in claim 1, wherein the devices are capacitance sensors configured to detect touches by a finger and the objects are finger.

4. The method recited in claim 1, wherein the structure is a folding wall.

5. The method recited in claim 1, wherein:
the first control station comprises a selector switch; and
the method further comprises turning the selector switch to move the structure after the second device detects the first object and the second device detects the second object.

6. The method recited in claim 5, wherein turning the selector switch comprises turning the selector switch from an off position to an on position using a key.

7. The method recited in claim 5, wherein the structure will not move unless the selector switch is turned from an off position to an on position after the second device detects the first object and the second device detects the second object.

8. The method recited in claim 5, wherein the selector switch is prevented from being turned from an off position to an on position if the second device fails to detect the first object, or the second device fails to detect the second object.

9. A method comprising:
providing a first control station and a second control station, the control stations being configured to control movement of a structure, the first control station comprising a first device and a second device, the second station comprising a third device;
capturing and recording a first image using the first device;
capturing and recording a second image using the first device;
comparing the second image against the first image;
allowing movement of the structure if the second image is substantially similar to the first image, the second device detects a first object, and the third device detects a second object; and
preventing movement of the structure if the second image is not substantially similar to the first image, the second device fails to detect the first object, or the third device fails to detect the second object.

10. The method recited in claim 9, wherein the first device is a fingerprint scanner and the images are images of fingerprints.

11. The method recited in claim 9, wherein the second device and the third device are sensors configured to detect touches by a body part and the objects are body parts.

12. The method recited in claim 9, wherein:
the first device is a fingerprint scanner and the images are images of fingerprints; and
the second device and the third device are sensors configured to detect touches by a body part and the objects are body parts.

13. The method recited in claim 9, wherein the structure is a folding wall.

14. The method recited in claim 9, wherein:
the first control station comprises a selector switch; and
the method further comprises turning the selector switch to move the structure after it is determined that the second image is substantially similar to the first image, the second device detects the first object, and the third device detects the second object.

15. The method recited in claim 14, wherein turning the selector switch comprises turning the selector switch from an off position to an on position using a key.

16. The method recited in claim 14, wherein the structure will not move unless the selector switch is turned from an off position to an on position after it is determined that the second image is substantially similar to the first image, the second device detects the first object, and the third device detects the second object.

17. The method recited in claim 14, wherein the selector switch is prevented from being turned from an off position to an on position if the second image is not substantially similar to the first image, the second device fails to detect the first object, or the third device fails to detect the second object.

18. The method recited in claim 9, wherein the second control station is spaced apart from the first control station and is in communication with the first control station.

19. A method comprising:
providing a first control station and a second control station that is spaced apart from the first control station, the control stations being configured to control movement of a folding wall, the first control station being in communication with the second control station, the first control station comprising a capacitance fingerprint scanner and a first sensor configured to detect touches by a finger of a first individual, the second station comprising a second sensor configured to detect touches by a finger of a second individual;
capturing and recording a first image of the first individual's fingerprint using the capacitance fingerprint scanner;
capturing and recording a second image of the first individual's fingerprint using the capacitance fingerprint scanner;
comparing the second image against the first image;
allowing movement of the folding wall if the second image is substantially similar to the first image, the first sensor detects the finger of the first individual, and the second sensor detects the finger of the second individual; and
preventing movement of the folding wall if the second image is not substantially similar to the first image, the first sensor fails to detect the finger of the first individual, or the second sensor fails to detect the finger of the second individual.

20. A method comprising:
providing a first control station and a second control station, the control stations being configured to control movement of a structure, the first control station comprising a first device, the second station comprising a second device;
allowing movement of the structure if the second device detects a first object and the second device detects a second object; and
preventing movement of the structure if the first device fails to detect the first object, or the second device fails to detect the second object,
wherein the first control station comprises a selector switch, wherein the method further comprises turning the selector switch to move the structure after the second device detects the first object and the second device detects the second object, and wherein the selector switch is prevented from being turned from an off position to an on position if the second device fails to detect the first object, or the second device fails to detect the second object.

21. The method recited in claim 20, wherein the devices are sensors configured to detect touches by a body part and the objects are body parts.

\* \* \* \* \*